United States Patent [19]

Simonton et al.

[11] Patent Number: 4,680,242

[45] Date of Patent: Jul. 14, 1987

[54] WRAPPED BATTERY PLATE

[75] Inventors: Robert D. Simonton, Fremont; Douglas E. Breese, Oregon, both of Ohio

[73] Assignee: Fremont Special Machine Company, Inc., Fremont, Ohio

[21] Appl. No.: 871,306

[22] Filed: Aug. 4, 1986

Related U.S. Application Data

[63] Continuation of Ser. No. 747,716, Jun. 24, 1985, abandoned.

[51] Int. Cl.$^4$ .............................................. H01M 2/18
[52] U.S. Cl. ...................................... 429/136; 429/139; 429/246; 429/254
[58] Field of Search ............... 429/136, 139, 131, 142, 429/246, 254

[56] References Cited

U.S. PATENT DOCUMENTS

| | | | |
|---|---|---|---|
| 2,934,585 | 4/1960 | Zahn | 429/139 |
| 3,476,612 | 11/1969 | Tench | 429/142 X |
| 3,703,417 | 11/1972 | Rosa et al. | 429/139 |
| 4,283,264 | 8/1981 | Darling et al. | 429/139 X |
| 4,396,691 | 8/1983 | Wheadon | 429/139 X |
| 4,552,823 | 11/1985 | Wozniak | 429/139 X |

Primary Examiner—Anthony Skapars
Attorney, Agent, or Firm—David H. Wilson

[57] ABSTRACT

A battery plate wrapper blank comprising a sheet of plate wrapper material is provided with attached longitudinal edge protective strips positioned to overlay the longitudinal sides of a battery plate which it is adapted to envelope and with a bottom edge protective strip attached along the bottom transverse margin of the sheet to overlay the bottom edge of the battery plate. The unitary plate wrapper blank is formed into a plate pouch without need of additional elements. Varients of the plate wrapper blank provide inner, outer or inner and outer longitudinal edge protective strips for the pouch, and a seal strip for the longitudinal seam of the pouch. A plate wrapped with the wrapper blank is adapted to closely fit a battery case since its longitudinal seam is overlapped as an inner face of a margin overlaying an outer face of an opposite margin in a plane parallel to the major face of the plate and the fin of overlapped wrapper material at the plate bottom is accordion pleated to fold against the bottom of the wrapper and plate.

11 Claims, 11 Drawing Figures

WRAPPED BATTERY PLATE

This is a continuation of co-pending application Ser. No. 747,716 filed on June 24, 1985, now abandoned.

This invention relates to wrapped plates for storage batteries, wrapper blanks for wrapping battery plates, and battery plate pouches formed from such wrapper blanks.

Battery plates for industrial or automotive storage batteries have been wrapped in sheet material which retains the active material in a grid structure without impeding electromechanical action at the plate when it is incorporated with one or more additional plates into a battery cell. In the past, plates have been wrapped in a material such as fiberglass mat which is inert to the cell constituents, permits ionic flow between plates, and contains the active material in the grid. The mat is held in position on and against the plate by a plastic web wrap sheet which is folded around the plate and mat and overlapped and joined, for example, by heat sealing to complete the assembly. In some instances, a separate plastic foot is folded around the bottom of the plate and superposed mat to protect the bottom edge from abrasion and puncture and is sealed to the lower edge of the web sheet as by heat sealing. Further protection of the wrap assembly at the plate lateral edges is provided by the outer containment webbed sheet of plastic having continuous plastic strips at the margins and in bands registering with the region overlaying the plate lateral and transverse edges. This multipiece assembly and wrapping process has been performed manually and is expensive in regard to both material and labor.

Alternative forms of plate wrappers having protective means or reenforcement are disclosed in Honey et al., U.S. Pat. No. 2,570,677 of Oct. 9, 1951 for "Battery Separator", in Rosa et al., U.S. Pat. No. 3,703,417 of Nov. 21, 1972 for "Heat Sealed Flexible Envelope Separator and Battery Embodying Same", in Vecchiotti, U.S. Pat. No. 4,197,364 of Apr. 8, 1980 for "Battery Separator and Method Manufacturing Same" and in Jaeger, U.S. Pat. No. 4,215,186 of July 29, 1980 for "Battery Plate Separator and Battery Containing the Same".

In Honey et al. the plate is enclosed in an envelope of micro-porous material consisting of two parts shaped or molded to enclose the plate between them and to overlap at their meeting edges around the edge of the plate except where the plate current carrying lug projects, thereby providing extra thickness at the edges. They also suggest inserting strips to join the edges of the micro-porous sheets and reinforcing the bottom of the envelope by inserting a strip of the same of other acid resisting material at the overlapped bottom edges.

Rosa disclosed an envelope made up of two sheets having overlapping margins which extend beyond the margins of the plate when they are placed over the plate with a sealant solution applied to the edge portions as by brushing or dipping. The coated edge portions are heat sealed to join or adhere those portions to each other in a double thickness margin coplanar with the plate around its edges.

The Vecchiotti patent discloses opposed sheets bonded together to form a sleeve by a thick strip or strips of polyvinylchloride which are high frequency heat sealed or otherwise bonded to the sheets. The structure bridges the space between the micro-porous plastic material of the sleeve major faces with the plastic strip having edges which abut confronting inner faces of the opposed sheets.

Jaeger discloses a plate wrapping material made up of a central grid or screen of nylon having a random polypropylene fiber placement over each face of the grid. This reinforced fabric is arranged with the placement of the fibers into the screen such that one side of the screen is provided with a relatively porous overlay and the opposite side has a relatively dense and calandered overlay. The porous side is intended to be positioned against the cell plate to hold the active material in the grid.

An object of the present invention is to improve wrapped plates and the wrappers for cell plates by simplifying the wrappers and arranging the wrappers for convenient formation into pouches and application to the plates either manually or by automatic machinery thereby reducing the cost of wrapped plates.

Another object is to increase the durability of wrappers for plates.

In accordance with the above objects, a feature of the invention involves a one piece wrapper blank assembly in the form of a sheet of felted, fiberous, point bonded, polyester or similar ion permeable, acid resistant, flexible sheet material having strips of tough, abrasion resistant, flexible, acid resistant material secured in positions to register with the edges of a plate when the wrapper blank is formed into a pouch and positioned around the plate. The strip material is arranged as two parallel longitudinal strips to protect the wrapper at the plate sides. The strips are centered on a spacing equal to the sum of the width and thickness of the plate and are of a width to fold around the thickness of the plate and overlay plate margins on each major face without significantly overlaying the active material of the plate. A strip also can be placed along the transverse margin of the sheet which will contain the plate bottom to protect the bottom of the pouch from damage by the plate bottom and casing support therefor and, when of bondable material, the bottom strip can be employed to provide the bond closing the bottom of the pouch.

The longitudinal sides of the wrapper blank can be bonded together as by adhesive or solvent or thermal fusing of overlapped portions of the wrapper sheet material. Alternatively a strip of bondable material can be placed at the margin which overlaps its opposed margin and can be bonded as with the pouch bottom whereby the strip material contributes to the bond as at least a portion of the bonding medium.

The above and additional objects and features of this invention will be appreciated more fully from the following detailed description when read with reference to the accompanying drawings in which.

Figure 1:
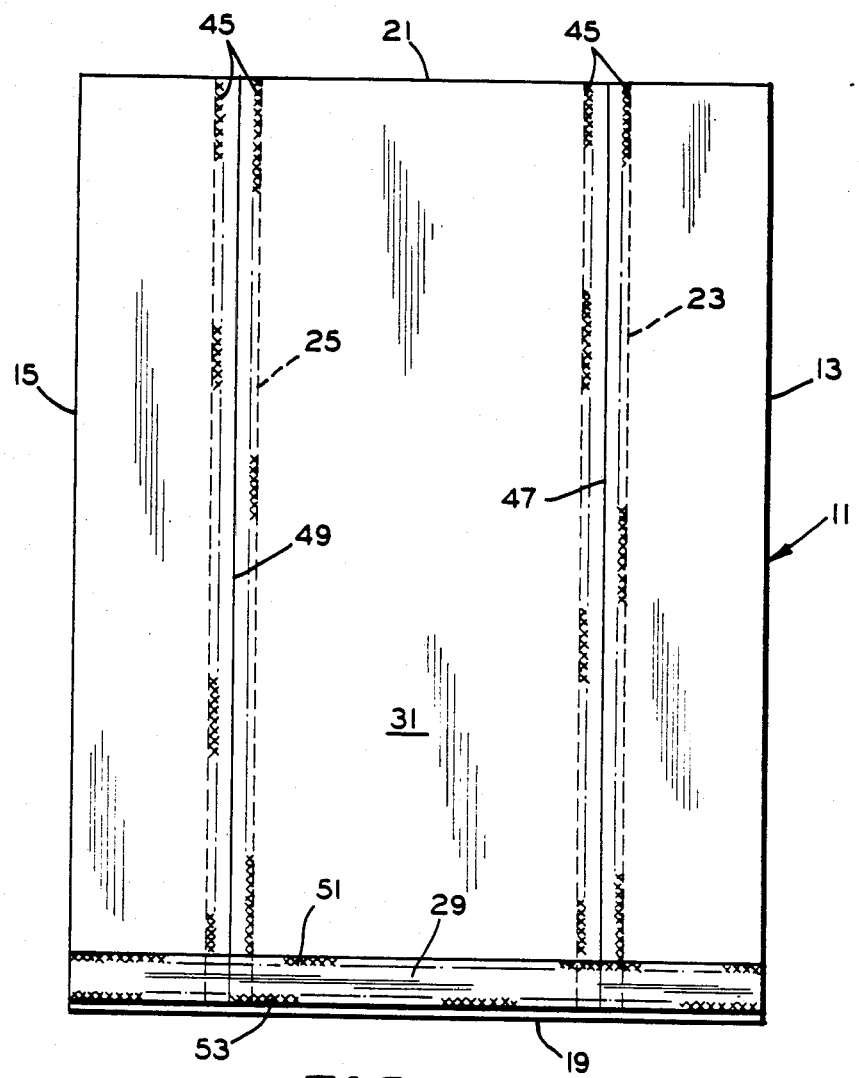
FIG. 1 is a plan view of a wrapper sheet blank with reinforcing plate edge strips according to one form of this invention.
Figure 7:
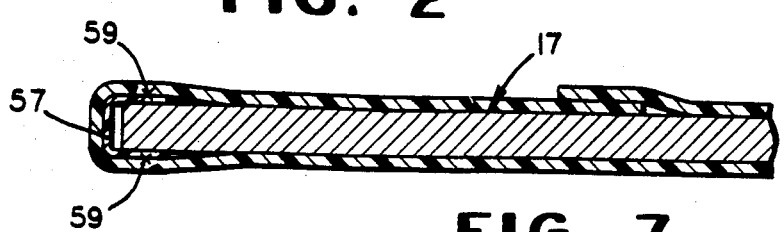
FIG. 7 is a sectional view taken as in FIG. 3 for an alternative embodiment of this invention in which the protective strips for the longitudinal sides of the wrapped plate are inside of the wrapper pouch.

The wrapper sheet blank of FIG. 1 comprises a flexible sheet 11 of non-woven fiberous material which is of a composition compatible with the electrolyte and products of the electrolytic action which occurs in the secondary cell in which it is to be employed. The sheet 11 is defined by longitudinal margin regions 13 and 15 which extends in the direction of the sides of the cell plate 17 which it will envelope and a bottom and top transverse margin regions 19 and 21. The one piece wrapper blank assembly includes protective strips for the edges of the pouch to be formed from the blank which are secured to the sheet face. Several embodiments of strips combined with the sheet are contemplated depending upon the utilization of the wrapper or pouch into which the combination is formed. The pouch and wrapped plate in some applications requires protection from the casing, particularly the tendency to tear or abrade the pouch edges on the casing lip as the wrapped plate is inserted in the casing, and in such circumstances the edge protecting strips are positioned on the exterior of the pouch, as shown in FIGS. 1 through 5. Protection of the pouch from the plate may be dictated in which case the edge protecting strips are positioned within the pouch, as shown in FIG. 7. Internal protective strips are used to particular advantage when the pouch is formed separately and the plate then inserted into the formed pouch. In some instances protective strips are desirable on both the interior and exterior surfaces of the sheet at the pouch edges.

In FIGS. 1 through 4, external longitudinal protective strips 23 and 25 are secured to sheet 11 on the face 27 which will be formed as the outside of the pouch wall in a wrapped plate assembly 33. A bottom protective strip 29 is secured to the sheet face 31 which will be adjacent the cell plate 17 along the bottom margin 19 for protection of the wrapper envelope at the plate bottom.

Advantageously, the protective strips 23, 25, and 29 are of a flexible, abrasion and puncture resistant, tough sheet material which is bondable to itself and to the wrapper sheet material. These strips are secured to the wrapper sheet 11 to coincide with the plate edges by spacing the longitudinal centerlines of the longitudinal strips 23 and 25 a distance equal to the sum of the plate transverse width and thickness so that the pouch 35 formed from the wrapper blank has its longitudinal edges and side folds on the centerlines. In the example of an overlapped longitudinal wrapper seam 37 which is centered across the pouch width, the strips 23 and 25 are each approximately equidistant from and parallel to their proximate longitudinal sheet margins 13 and 15 of a rectangular sheet and are longitudinally centered approximately one half of the plate width plus one half the plate thickness plus an allowance for an overlapped seam 37 from those margins. The bottom strip 29 is secured in registry with the bottom transverse margin region with its lower longitudinal edge slightly above the bottom margin of sheet 11 and extends across the width of sheet 11 on its face 31.

Figure 3:
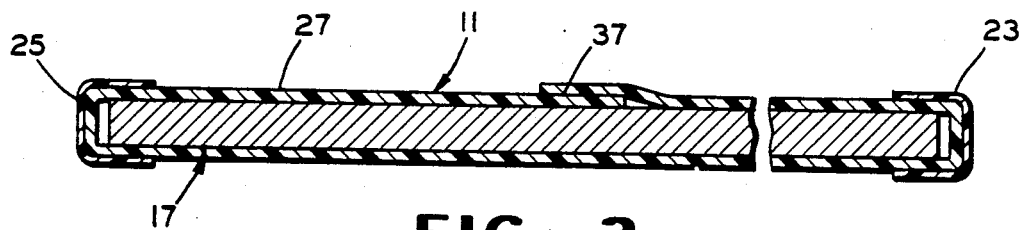
FIG. 3 is a sectional view of the wrapped plate of FIG. 2 taken along the line 3—3 of FIG. 2.
Figure 4:
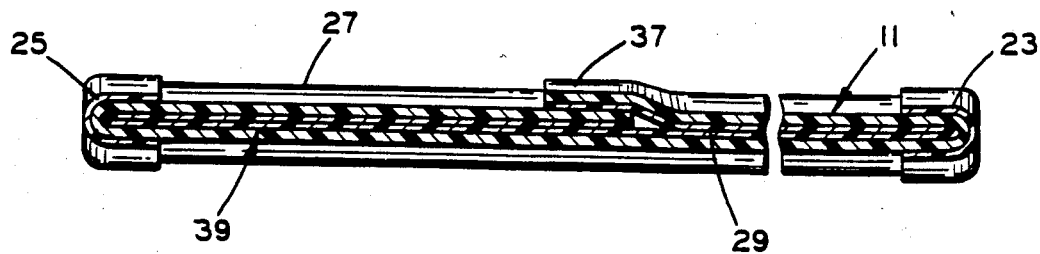
FIG. 4 is a sectional view of the wrapped plate of FIG. 2 taken along the line 4—4 of FIG. 2.
Figure 2:
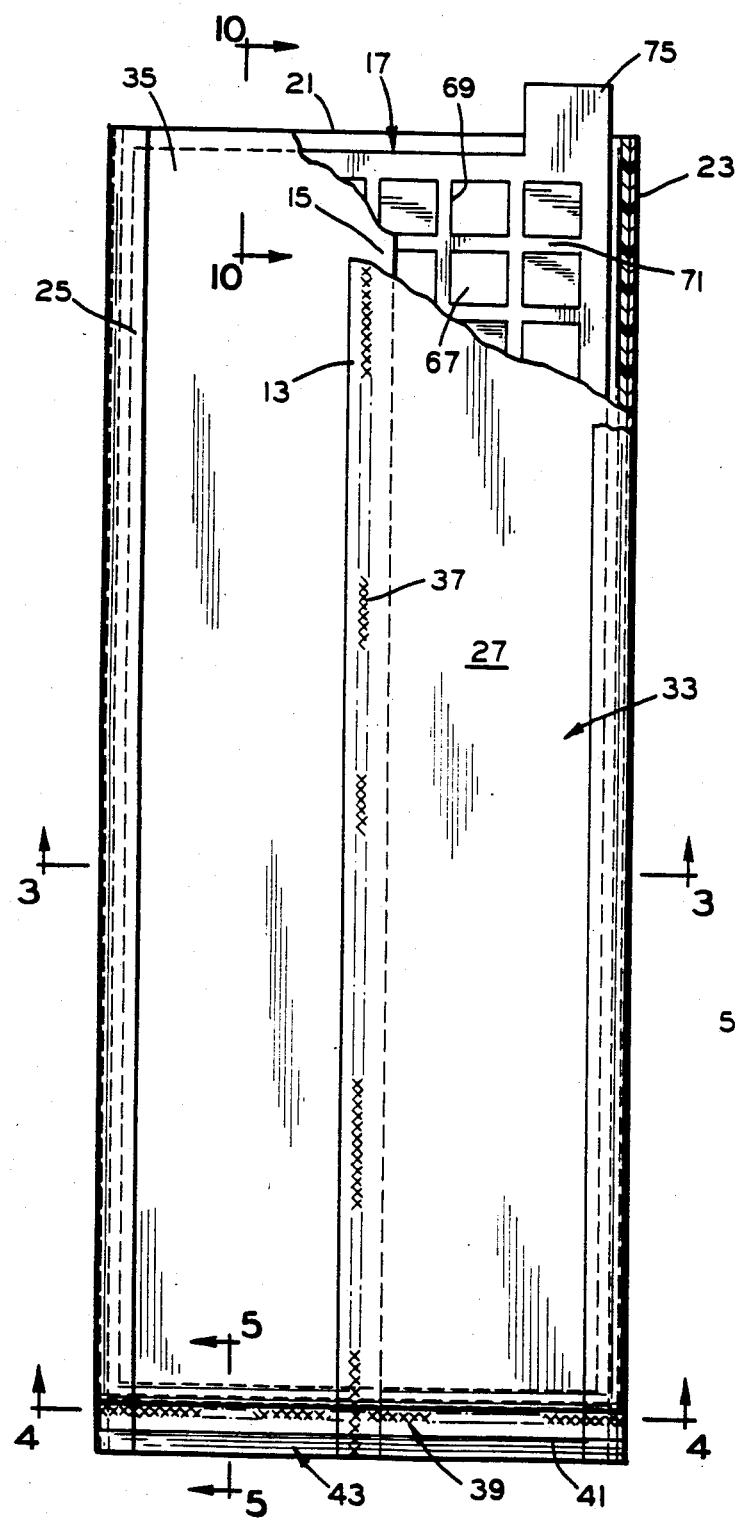
FIG. 2 is plan view of the blank of FIG. 1 wrapped on a cell plate according to this invention with portions broken away to disclose the structure more clearly.

As shown in FIGS. 2, 3, and 4, a wrapper pouch 35 is formed from the wrapper blank by folding sheet 11 along the center line of strips 23 and 25 to overlap longitudinal edge regions 13 and 15. These regions are secured together at longitudinal seam 37 so that protective boots of strip material are provided by the protective strips 23 and 25 for the longitudinal sides of the wrapper pouch 35 thus formed. It should be noted that the width of the plates 17 in the cell should closely fit the sidewalls of the cell casing (not shown) in order to maximize the plate area contained within a given casing dimension. The space taken up at the plate edges by the pouch wall should be minimized. Thus, the location of the longitudinal seam 37 on a major face of the wrapper pouch as an overlap with the inner face of one side marginal region 13 of the sheet 11 overlaying the outer face of the opposite side marginal region 15 as a seam lying generally in the surface of the pouch wall minimizes the pouch wall at the plate edges to the thickness of the sheet 11 and a protective strip 23 or 25. The bottom seam 39 is formed as an accordion pleat 41 near and parallel to the bottom margin 19 of sheet 11 and the overlaying longitudinal margin of strip 29 so that the fin 43 of wrapper and sandwiched reinforcing strip extending beyond the bottom of the plate will fold upon itself when bottomed in the cell casing.

In order to insure that the reinforcing strip edges are not separated from the sheet surfaces in the pouch-plate assembly the longitudinal edge regions of the strips are secured to the sheet surface. It is advantageous to employ materials and techniques which effect bonds between the several surfaces including wrapper sheet-to-wrapper sheet, wrapper sheet-to-protective strip and protective strip-to-protective strip. Such bonds can be by adhesive, solvent fusion or thermal fusion means. In a lead-acid storage battery a suitable material for sheet 11 is a felted fiber, point bonded, polyester material and the protective strips 23, 25 and 29 can be tapes of polyethylene. More particularly industrial battery plates of about one fourth inch by six inches by seventeen inches have been wrapped with sheet material of Pellon 2131 from Pellon Corporation, 20 Industrial Ave., Chelmsford, Mass., which is a polyester fiber, thermally point bonded and has a weight of 138 gm./m² is 0.030 inches thick, has a tensile strength by ASTM D1682-md of 13.3 pounds/in. and an elongation at break md of 35% and the strips 23, 25 and 29 are 6 mil polyethylene film strips about seven eighths of an inch wide. In such a combination thermal fusion can be employed effectively for each of the aforementioned bonds so that the longitudinal strips 23 and 25 are secured to sheet 11 along bond lines 45 wherein the polyethylene is fused and flows into the interstices of the polyester felt on either side of fold lines 47 and 49 and the bottom strip 29 is secured similarly along an upper and lower bond line 51 and 53. The longitudinal seam 37 is thermally fused as a polyester-to-polyester fusion bond as shown in FIGS. 2, 3, and 4.

Figure 8:
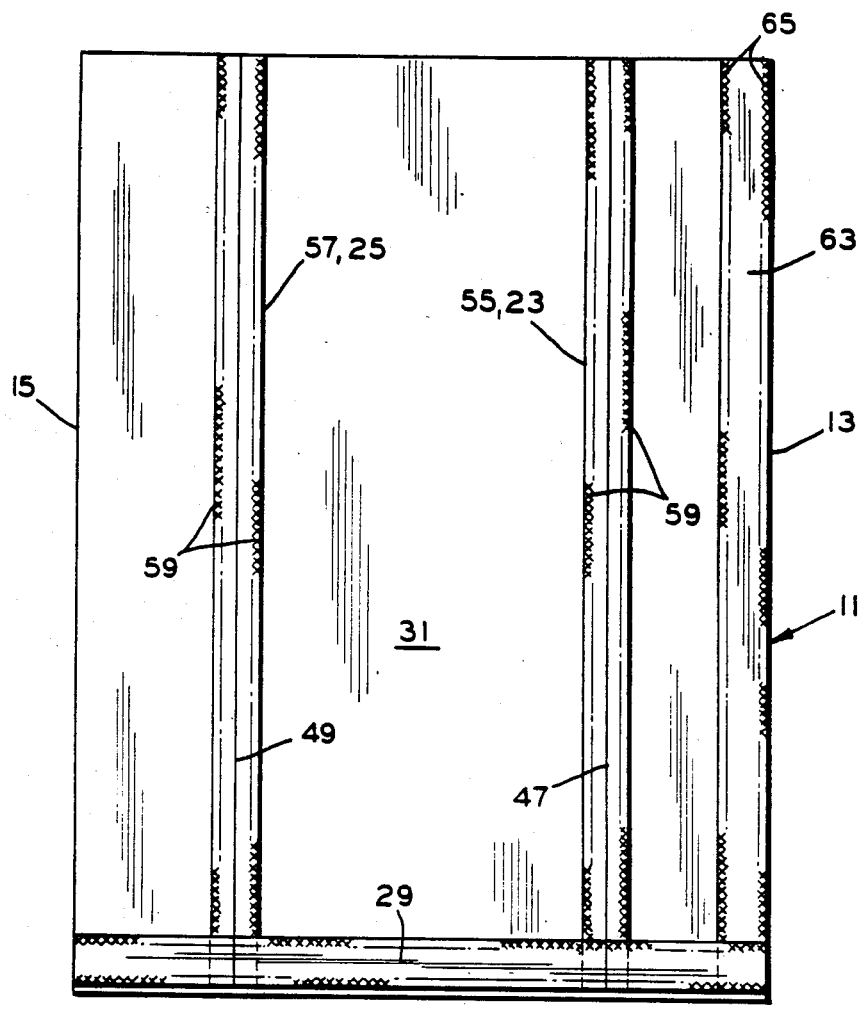
FIG. 8 is plan view showing a modified wrapper blank having a seal strip for the longitudinal seam of the wrapper pouch with protective marginal strips on inner and outer surfaces of the wrapper blank.
Figure 9:
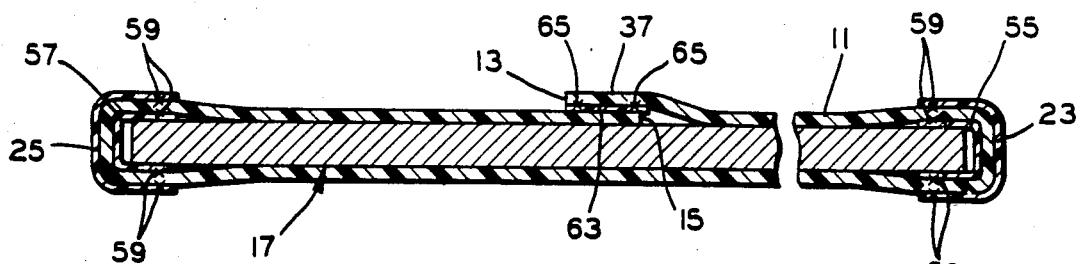
FIG. 9 is a sectional view of a wrapped plate having a seal strip and protective strips of FIG. 8, the view being taken as in FIG. 3.
Figure 11:
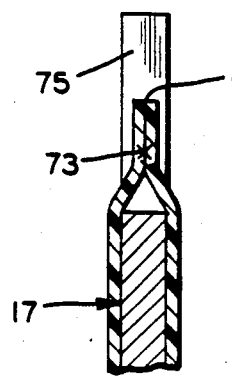
FIG. 11 is a sectional view of the top portion of a wrapped plate having an upper edge seal according to this invention, the section being taken as at location 10—10 of FIG. 2.

Wrapper pouch 35 is formed either independently of the cell plate 17, as by wrapping around a mandrel and sealing longitudinal seam 37, or around a plate 17 and into a subassembly as shown in FIGS. 2 through 7, 9, 10 and 11. When wrapped on a plate, the sheet is primarily subjected to conditions which tend to tear or abrade it as the wrapped plate is inserted into a casing for the cell. Protection from such damage is provided by external edge protective strips 23 and 25. When the pouch 35 is formed independently of plate 17, it is exposed to potential damage when the plate is inserted, and it is advantageous to provide internal, longitudinal, edge, protective strips 55 and 57 bonded to sheet 11 at edge bonds 59, as shown in FIG. 7. In some instances the wrapper blank can be formed with both internal and external, longitudinal, edge, protective strips 55, 57, 23 and 25 as shown in FIG. 8 and 9 so that plate edge abrasion and tearing of the inner surface of sheet 11 and casing abrasion and tearing of the outer surface is prevented.

Figure 5:
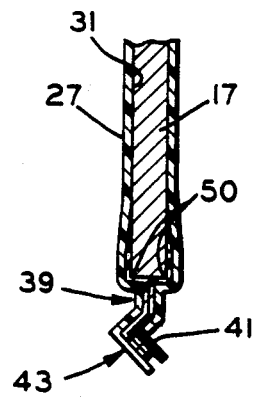
FIG. 5 is sectional view of a bottom portion of the wrapped plate taken along the line 5—5 of FIG. 2.
Figure 6:
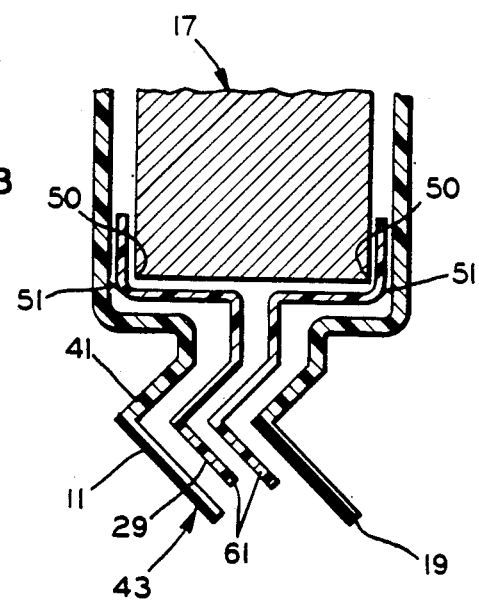
FIG. 6 is an exploded view on an enlarged scale of portion of FIG. 5.
Figure 10:
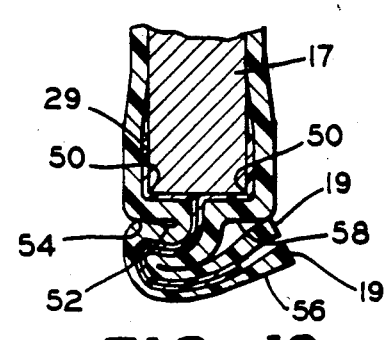
FIG. 10 is a sectional view of a modified form of wrapped plate bottom edge as taken at 5—5 of FIG. 2 showing a flattened thermoformed bottom edge.

The bottom of the pouch 35 is closed by a broad area bond over the accordion pleated area 41 as shown in FIGS. 5, 6 and 10. Bottom protective strip 29 is secured to sheet 11 in the wrapper blank assembly by an upper bond line 51 and a lower bond line 53 extending with the strip parallel to the sheet transverse margin 19. Bottom protective strip 29 is bonded upon itself at its inner faces 61 and to the sheet 11 over a broad area of the pleated fin 43, advantageously between conforming heated mandrels to produce the form shown in FIGS. 5 and 6. Strip 29 forms a boot around the bottom edges 50 of plate 17 since its upper edge bond 51 causes it to be held against sheet 11 and assume the form of the bottom margin 19 region of sheet 11 around the plate 17. Pouch bottom bond is formed following the formation of longitudinal seam 37 and can be formed in either a pouch formed independently of cell plate 17 or a pouch wrapped on cell plate 17.

Thermal fusion of the bottom seam 39 involves heating a relatively thick sandwich of the two outer layers of polyester and the two inner layers of polyethylene and thus the application of substantial heat. Although the polyester has a thermal softening temperature significantly greater than that of the polyethylene, enough heat is required to obtain a good bond at the polyethylene to polyethylene interface that both the polyethylene and polyester flows. Accordingly, it is desirable to position the lower edge of the polyethylene tape 29 above the lower edge of the polyester so that the polyethylene does not flow beyond the polyester bottom margin 19. The polyethylene, in its fluid state, flows into the polyester felted fiber sheet and the polyester-polyethylene sandwich is somewhat compressed so that upon cooling it is a more dense and stiffer material. In some applications the stiffness of the accordion pleated bottom seam 41 and fin 43 as shown in FIG. 5 is so great that it does not fold upon itself to a compact form when placed in the battery case.

In order to assure compaction of the wrapper bottom seam 41 and fin 43, it has been found advantageous to compress the pleat immediately following heat sealing and while the plastic components are still soft. This can be done by a pressing foot (not shown) which compresses and holds the material in the form shown in FIG. 10 until it cools and solidifies in the compressed form. The pressing foot also can be provided with corner compressing surfaces which engage the longitudinal corners at the bottom seam to bring them into alignment with the longitudinal sides of the wrapped plate thereby facilitating insertion of that plate into a battery casing. As shown in FIG. 10 the pressed bottom causes essentially the entire bonded seam to conform to the bottom of the wrapped plate by the return of the upper seam region 52 against the bottom outer wrapper wall 54 and the extension of the distal end 56 of the seam and bonded bottom margin adjacent the opposite side bottom outer wrapper wall 58. Thus, the bond between the sandwiched layers of sheet 11 and tape 29 includes portions on each side of the accordion pleat laying closely upon each other and closely against the unbonded portion 54 and 58 of the sheet adjacent the bond.

When a longitudinal seam of increased strength over that obtained from bonding the edges of longitudinal margins 13 and 15 is desired, or where the sheet 11 is of a material which does not readily bond to itself, a strip 63 can be employed as the bonding medium as shown in FIGS. 8 and 9. Strip 63 is secured to the sheet blank longitudinal margin region which, when folded to overlap the opposite longitudinal margin region, engages its free surface with that opposite region. Thus, where margin region 13 overlays region 15, strip 63 can be secured to inner sheet face 31 at margin 13 or outer sheet face 27 at margin 15 by means of strip marginal bonds 65 to the sheet. The longitudinal seam 37 of the pouch and the securing of the seal strip 63 to sheet 11 can be accomplished by thermal fusion in the exemplary polyethylene seal strip.

In addition to retaining the active material 67 within the cavities 69 of grid 71 in plate 17, the wrapper also inhibits the formation of bridging structures between plates as is known to occur in operation of the battery and is termed "treeing". Further, "mossing" or the development of deposits at the top of the plate can be inhibited by the disclosed wrapper by sealing the upper edge 21 of the wrapper along that edge at seam 73 so that only the connector lug 75 protrudes, as shown in FIG. 10. In the industrial battery plate example such a top seal can be formed by thermally bonding the wrapper sheet upper edges 21 upon themselves where they overlap. To facilitate such a bond the sheet should extend above the upper plate edge about one half inch on each side in the industrial battery plate disclosed.

It is to be understood that the plate wrapper blank can be of other materials than those disclosed above and that the wrapper structure can be applied to cells other than of the lead acid type. When it is desired to maintain active material 67 within the perforations or cavities 69 of a grid 71 making up plate 17 the structure of the wrapper blank and a wrapped plate as disclosed can be applied to cell plates of the nickel-iron, nickel-zinc, nickel-cadimum and other known types. In each of these forms of storage batteries, when wrapped plates are employed, substantial savings in manufacture can be achieved by the assembly of a sheet 11, longitudinal edge protective strips 23, 25 and/or 55, 57, a bottom protective strip 29 and, in certain circumstances as described, a seal strip 63, into a unitary wrapper blank so that only the wrapper blank need be manipulated in the formation of the wrapper pouch and its application to a plate.

We claim:

1. A wrapped battery plate comprising a rectangular plate having opposed major faces having longitudinal sides and transverse sides, and having edges at the intersections of said sides with said major faces; a single rectangular wrapper sheet of flexible material which is permeable to electrolyte and compatible with the products of electrolytic action within the cell in which the wrapped plate is adapted to be utilized said sheet being wrapped around said longitudinal sides and longitudinal edges of said plate and having opposed longitudinal margins in close proximity over their lengths laying against one of said major faces of said plate, a joint between said opposed longitudinal margins of said wrapper sheet over their length on said one face of said plate with the joined wrapper sheet margins generally parallel to said one face; a first transverse margin region of said wrapper sheet extending between said longitudinal sides at one end of said wrapper sheet and projecting beyond the transverse side and edges of said plate proximate said one end of said wrapper sheet; a broad area bond along said first transverse margin region of said wrapper sheet between portions of the sheet transverse margin overlaying each other and projecting beyond the proximate transverse side of said plate closely adjacent said transverse side and said bond area being of a width of at least the thickness of the plate and of a length corresponding to the length of the plate transverse side; and an accordion pleat extending along said broad area bond parallel to the adjacent transverse side of the plate and having portions of said bond on each side of the pleat fold.

2. A combination according to claim 1 wherein the broad area bond is collapsed against and generally parallels the adjacent transverse side of the plate on each side of the accordion pleat fold.

3. A combination according to claim 2 wherein the material of the wrapper sheet is thermoplastic and said broad area bond includes thermally fused material of said wrapper sheet.

4. A combination according to claim 1 including a tape of tough flexible thermoplastic sheet material of a length generally corresponding to the length of said first transverse margin of said wrapper sheet secured to said wrapper sheet over the region on which said broad area bond is to be formed; and a thermal fusion bond between said wrapper sheet transverse margin regions overlaying each other and said tape to form said broad area bond.

5. A combination according to claim 4 wherein said tape is of a width exceeding the sum of the width of the broad area bond and one half of a plate thickness between major faces and is secured to the wrapper sheeet inward of said broad area bond and generally parallel to said first transverse margin whereby said tape has a portion inward of said bond extending over said plate edges proximate said one sheet margin.

6. A combination according to claim 4 wherein said wrapper sheet is thermoplastic and said tape has a thermal softening temperature less than said wrapper; wherein said thermal fusion bond includes thermally softened wrapper sheet material; and wherein said tape longitudinal side most remote from said plate is spaced from said sheet margin sufficiently to avoid the flow of tape material beyond said margin.

7. A combination according to claim 1 wherein said joint between said opposed longitudinal margins of said wrapper sheet includes a thermoplastic sheet tape extending along and thermally fused to said opposed longitudinal margins of said wrapper sheet.

8. A combination according to claim 7 wherein said wrapper sheet is polyester and said tape sheet is polyethylene.

9. A combination according to claim 7 wherein said tape has a length substantially the length of said longitudinal margins of said sheet and extends along said longitudinal margins, said tape having a width of less than fifteen percent (15%) of the width of one major face of said plate.

10. A combination according to claim 1 including tape protective strips of flexible abrasion and puncture resistant, tough sheet material extending over the longitudinal edges at each longitudinal side of said plate and of a length corresponding to the length of the longitudinal sides of the sheet wrapper on the wrapped plate and bonded to said sheet wrapper along the longitudinal edges of said tape, said tape lengths being generally the length of said plate.

11. A combination according to claim 10 wherein said tape is of a thermoplastic material and is bonded to said sheet wrapper by thermal fusion bonds.

* * * * *